United States Patent
Bookman et al.

(10) Patent No.: US 10,856,052 B1
(45) Date of Patent: Dec. 1, 2020

(54) LOCALIZED PEER-TO-PEER NETWORK OF SET TOP BOXES

(75) Inventors: Colin Paul Bookman, Atlanta, GA (US); Douglas David Gravino, Roswell, GA (US)

(73) Assignee: Cox Communications, Inc., Atlanta, GA (US)

( * ) Notice: Subject to any disclaimer, the term of this patent is extended or adjusted under 35 U.S.C. 154(b) by 483 days.

(21) Appl. No.: 13/456,966

(22) Filed: Apr. 26, 2012

(51) Int. Cl.
| | |
|---|---|
| *H04N 7/173* | (2011.01) |
| *H04N 21/63* | (2011.01) |
| *H04N 21/422* | (2011.01) |
| *H04N 21/454* | (2011.01) |
| *H04N 21/262* | (2011.01) |
| *H04N 21/41* | (2011.01) |
| *H04N 21/478* | (2011.01) |
| *H04N 21/258* | (2011.01) |
| *H04N 21/835* | (2011.01) |
| *H04N 21/4788* | (2011.01) |
| *H04N 21/436* | (2011.01) |

(Continued)

(52) U.S. Cl.
CPC ......... *H04N 21/63* (2013.01); *H04N 21/2347* (2013.01); *H04N 21/23424* (2013.01); *H04N 21/25841* (2013.01); *H04N 21/26283* (2013.01); *H04N 21/4126* (2013.01); *H04N 21/42209* (2013.01); *H04N 21/436* (2013.01); *H04N 21/43615* (2013.01); *H04N 21/454* (2013.01); *H04N 21/458* (2013.01); *H04N 21/466* (2013.01); *H04N 21/478* (2013.01); *H04N 21/4788* (2013.01); *H04N 21/488* (2013.01); *H04N 21/632* (2013.01); *H04N 21/835* (2013.01)

(58) Field of Classification Search
CPC .. H04N 21/63; H04N 21/436; H04N 21/4788; H04N 21/632; H04N 21/454; H04N 21/835; H04N 21/25841; H04N 21/43615; H04N 21/2347; H04N 21/488; H04N 21/478; H04N 21/466; H04N 21/26283; H04N 21/458; H04N 21/23424; H04N 21/42209; H04N 21/4126
USPC ...... 725/31, 25, 91, 68, 27, 46, 141, 80, 48, 725/118, 34, 38, 110, 12, 14, 109, 87, 93; 709/229, 219, 217, 238
See application file for complete search history.

(56) References Cited

U.S. PATENT DOCUMENTS 7,080,400 B1 * 7/2006 Navar ................ H04N 7/17336
348/E7.073
7,177,911 B2 * 2/2007 deCarmo ............ H04L 12/403
709/208

(Continued)

*Primary Examiner* — Jason Salce
(74) *Attorney, Agent, or Firm* — Merchant & Gould PC

(57) ABSTRACT

A localized peer-to-peer (P2P) network of device for streaming content between users. Devices, such as set top boxes, in a network are configured to communicate with each other, and stream content physically located on each set top box to another set top box. Shows that the user has missed a portion of may be watched from the beginning by transferring such content from other devices within the network. Essentially, any one STB becomes part of a collective community of STBs which share and make each other's content available. The P2P STB network according to embodiments described herein also lessens the load on the centrally located video-on-demand servers by allowing users to watch content being delivered from a neighbor's DVR versus from the central source.

19 Claims, 10 Drawing Sheets

(51) Int. Cl.
*H04N 21/2347* (2011.01)
*H04N 21/466* (2011.01)
*H04N 21/458* (2011.01)
*H04N 21/234* (2011.01)
*H04N 21/488* (2011.01)

(56) References Cited

U.S. PATENT DOCUMENTS

| | | | | |
|---|---|---|---|---|
| 7,404,201 B2* | 7/2008 | Takeuchi | H04N 7/17336 | 725/109 |
| 7,783,777 B1* | 8/2010 | Pabla et al. | | 709/238 |
| 10,063,934 B2* | 8/2018 | Guo | H04N 21/4325 | |
| 2002/0133534 A1* | 9/2002 | Forslow | H04L 63/0272 | 709/200 |
| 2002/0157892 A1* | 10/2002 | Seipold | B60K 17/28 | 180/379 |
| 2003/0126600 A1* | 7/2003 | Heuvelman | H04N 5/44543 | 725/35 |
| 2003/0177495 A1* | 9/2003 | Needham | H04N 5/44543 | 725/55 |
| 2003/0204856 A1* | 10/2003 | Buxton | H04N 7/17318 | 725/120 |
| 2004/0128343 A1* | 7/2004 | Mayer | H04L 29/06 | 709/203 |
| 2004/0194130 A1* | 9/2004 | Konig | H04N 5/76 | 725/32 |
| 2005/0076390 A1* | 4/2005 | Klausberger | H04N 9/8042 | 725/134 |
| 2005/0183120 A1* | 8/2005 | Jain | H04N 7/17336 | 725/46 |
| 2006/0173963 A1* | 8/2006 | Roseway | H04L 51/04 | 709/206 |
| 2007/0067485 A1* | 3/2007 | Stotland | H04L 67/1085 | 709/232 |
| 2007/0157281 A1* | 7/2007 | Ellis | H04N 7/17309 | 725/134 |
| 2007/0174471 A1* | 7/2007 | Van Rossum | | 709/229 |
| 2007/0226368 A1* | 9/2007 | Strickland | G06Q 30/02 | 709/243 |
| 2007/0250848 A1* | 10/2007 | Gorti | H04N 21/6175 | 725/14 |
| 2008/0244042 A1* | 10/2008 | Jamin | H04N 21/632 | 709/220 |
| 2008/0301746 A1* | 12/2008 | Wiser | H04N 7/17318 | 725/114 |
| 2009/0083412 A1* | 3/2009 | Olaiya | H04L 67/1085 | 709/224 |
| 2009/0158318 A1* | 6/2009 | Levy | G06F 21/36 | 725/32 |
| 2009/0172762 A1* | 7/2009 | Assouline | H04N 7/17336 | 725/114 |
| 2009/0300673 A1* | 12/2009 | Bachet et al. | | 725/31 |
| 2010/0031162 A1* | 2/2010 | Wiser | G06F 21/36 | 715/747 |
| 2010/0146040 A1* | 6/2010 | Ramakrishnan | H04N 7/17318 | 709/203 |
| 2012/0257560 A1* | 10/2012 | Srinivasan | H04W 4/18 | 370/312 |

* cited by examiner

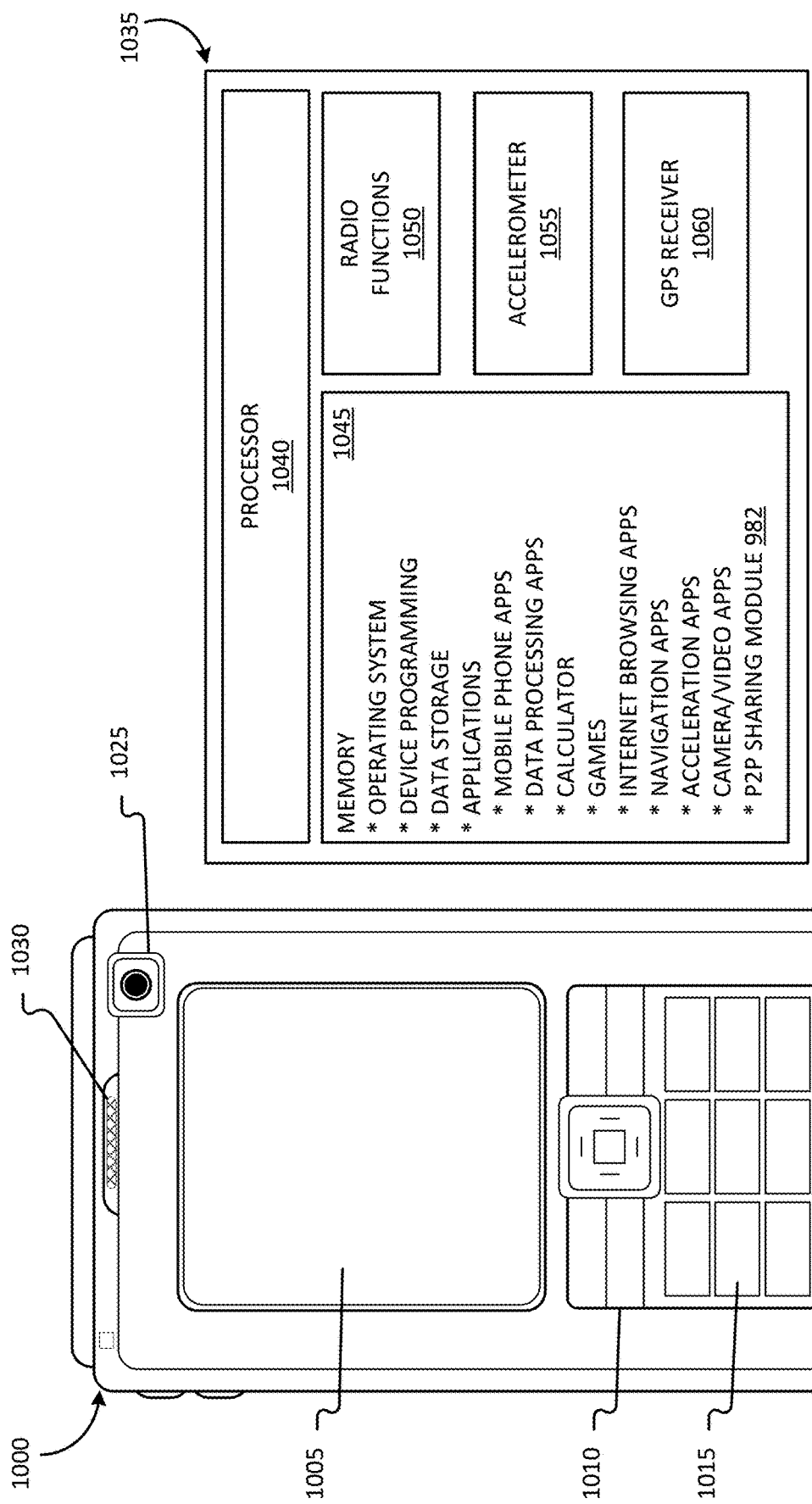

LOCALIZED PEER-TO-PEER NETWORK OF SET TOP BOXES

FIELD OF THE INVENTION

This disclosure relates in general to stream content in a network, and more particularly to providing a localized peer-to-peer (P2P) network of set top boxes (STBs) for streaming content between users.

BACKGROUND

In current video delivery system, viewers cannot watch an in-progress TV show from the start of the program unless they began to record it using their DVR. For example, if a first viewer wants to watch the start of Program A, and did not DVR Program A, and the first viewer started to watch Program A at 10:25, but Program A started at 10:00, the viewer would not be able to watch the first twenty-five minutes of Program A. The only alternatives are to watch the first 25 minutes online or from a VOD system (which usually involves waiting until the next day), or go to a friend's house who did DVR the program and watch the program there.

With programs that are available online, the viewer normally has to wait 24 hours or more to be able to watch that show. However, all programming is not available for watching online at a later date and the viewer cannot record every show they may be interested in.

Some services have been proposed to provide a TV network that requires a viewer to access online content, e.g., original distributed or broadcast content, through a computer system for a fee, rather than paying a cable or satellite operator. Thus, content is not provided directly to the source most viewers are interested in using to watch content. Within the network, computers record feeds and distribute the feed between all other subscribers. Thus, instead of using the traditional distribution method where content is streamed to everyone directly, content is streamed to only a few places and then subscribers may reuse and/or redistribute the content.

However, these services require an additional subscription payment because most viewers will maintain their normal source of content, i.e., cable or satellite television, movie, etc. provider. Furthermore, at least initially, a viewer begins to download the entire program even though the viewer may terminate the download once the missed programming has been recovered. In addition, the content provided by these services present only near-TV resolution images. Accordingly, such services merely add another fee for content access and do not solve the problem of being able to watch a complete version of the original content.

A second problem is that the centralized storage and bandwidth for on-demand streaming of VOD content can be prohibitively expensive. The nature of the VOD service requires massive storage from the video server and massive bandwidth from the network.

Another problem is that people want to watch programs they failed to record any of the program. Also, viewers often want to record programs that exceed the recording capabilities of their current DVR (storage space, multiple tuners, etc.).

SUMMARY OF THE INVENTION

To overcome the limitations described above, and to overcome other limitations that will become apparent upon reading and understanding the present specification, embodiments for providing a localized peer-to-peer (P2P) network of set top boxes (STBs) for streaming content between users are disclosed.

The above-described problems are solved by providing set top boxes in a network that are configured to communicate with each other, and stream content physically located on each set top box to another set top box. By implementing the peer-to-peer (P2P) set top box network, not only can live shows that the beginning was missed be watch from the start, but the P2P STB network provides substantially more storage flexibility that other video distribution methods. Essentially, any one STB becomes part of a collective community of STBs which share and make each other's content available. It also lessens the load on the centrally located video-on-demand servers by allowing users to watch content being delivered from a neighbor's DVR versus from the central source.

An embodiment includes a method that provides a peer-to-peer network for sharing content within a network. The method includes recording content at a first edge device in a network, sending a query within the network from a second edge device identify desired content, comparing the desired content identified in the query to content recorded at the first edge device and receiving from the first edge device the desired content identified in the query from the second edge device when content recorded at the first edge device correlates to the desired content identified in the query from the second edge device.

In another embodiment, a system for providing peer-to-peer network sharing of content is disclosed. The system includes a first edge device in a network recording content and a second edge device sending a query within the network identifying content desired by the second edge device, wherein the first device comparing the identified content desired by the second edge device to content recorded at the first edge device and providing the identified content for delivery to the second edge device.

A computer readable medium including executable instructions which, when executed by a processor, provides peer-to-peer network sharing of content, is disclosed. The computer readable medium includes instructions executable by the processor to record content at a first edge device in a network, send a query within the network from a second edge device identify desired content, compare the desired content identified in the query to content recorded at the first edge device and receive from the first edge device the desired content identified in the query from the second edge device when content recorded at the first edge device correlates to the desired content identified in the query from the second edge device.

These and various other advantages and features of novelty are pointed out with particularity in the claims annexed hereto and form a part hereof. However, for a better understanding of the disclosed embodiments, the advantages, and the objects obtained, reference should be made to the drawings which form a further part hereof, and to accompanying descriptive matter, in which there are illustrated and described specific examples of the disclosed embodiments.

BRIEF DESCRIPTION OF THE DRAWINGS

Referring now to the drawings in which like reference numbers represent corresponding parts throughout:

FIGS. 10a-b illustrate a suitable mobile computing environment with which embodiments may be practiced.

DETAILED DESCRIPTION

Embodiments of the present invention are directed to providing a localized peer-to-peer (P2P) network of set top boxes (STBs) for streaming content between users are disclosed. Set top boxes in a network are configured to communicate with each other, and stream content physically located on each set top box to another set top box. By implementing the peer-to-peer (P2P) set top box network, shows that the user has missed a portion of, can be watched from the beginning. Essentially, any one STB becomes part of a collective community of STBs which share and make each other's content available. The P2P STB network according to embodiments described herein also lessens the load on the centrally located video-on-demand servers by allowing users to watch content being delivered from a neighbor's DVR versus from the central source.

Figure 1:
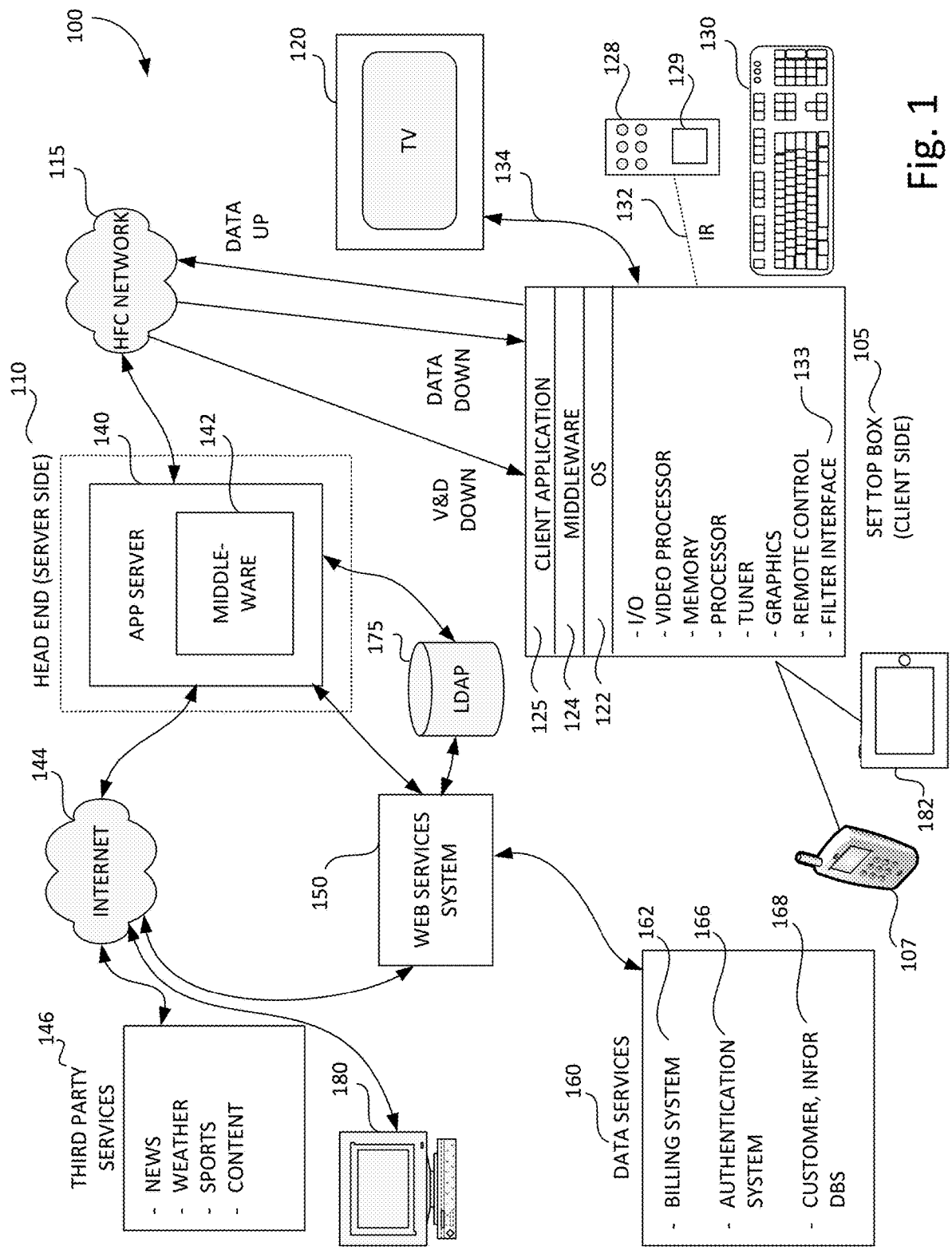
FIG. 1 is a simplified block diagram illustrating a cable television/services system architecture providing an operating environment according to an embodiment.

FIG. 1 is a simplified block diagram illustrating a cable television/services system 100 (hereafter referred to as "CATV") architecture providing an operating environment according to an embodiment. Referring now to FIG. 1, digital and analog video programming, information content and interactive television services are provided via a hybrid fiber coax (HFC) network 115 to a television set 120 for consumption by a cable television/services system customer. As is known to those skilled in the art, HFC networks 115 combine both optical fiber and coaxial cable lines. Typically, optical fiber runs from the cable head end 110 to neighborhoods of subscribers. Coaxial cable runs from the optical fiber feeders to each customer or subscriber. The functionality of the HFC network 115 allows for efficient bidirectional data flow between the client-side set-top box 105 and the server-side application server 140 of the embodiment.

The CATV system 100 is in the form of a distributed client-server computing system for providing video and data flow across the HFC network 115 between server-side services providers (e.g., cable television/services providers) via a server-side head end 110 and a client-side customer via a client-side set-top box (STB) 105 functionally connected to a customer receiving device, such as the television set 120. As is understood by those skilled in the art, modern CATV systems 100 may provide a variety of services across the HFC network 115 including traditional digital and analog video programming, telephone services, high speed Internet access, video-on-demand, and information services.

On the client side of the CATV system 100, digital and analog video programming and digital and analog data are provided to the customer television set 120 via the set-top box (STB) 105. Interactive television services that allow a customer to input data to the CATV system 100 likewise are provided by the STB 105. As illustrated in FIG. 1, the STB 105 is a multipurpose computing device having a computer processor, memory, and an input/output mechanism. The input/output mechanism receives input from server-side processes via the HFC network 115 and from customers via input devices such as the remote control device 128, keyboard 130, or other computing device 180, such as a tablet/slate computer, smart phone, etc. STB 105 provides a filter interface 133 for presenting filtered programming and/or content via STB 105 on the TV 120. While the filter interface 133 may be implemented using STB 105, the person having ordinary skills in the art will understand that the filter interface 133 may be provided through wireless device 107, any type of network media device 182, or any device capable of interfacing with a STB 105 or in a server or other module on the headend side 110. Such devices may include DVRs, wireless phones, PCs, laptop computers, tablet/slate computers, media viewing devices, or equivalents thereof. Further, filter interface 133 may be provided through a STB. The remote control device 128 and the keyboard 130 may communicate with the STB 105 via a suitable communication transport such as the infrared connection 132. The remote control device 128 may include a biometric input module 129. The STB 105 also includes a video processor for processing and providing digital and analog video signaling to the television set 120 via a cable communication transport 134. A multi-channel tuner is provided for processing video and data to and from the STB 105 and the server-side head end system 110, described below.

The STB 105 also includes an operating system 122 for directing the functions of the STB 105 in conjunction with a variety of client applications 125. For example, if a client application 125 requires a news flash from a third-party news source to be displayed on the television 120, the operating system 122 may cause the graphics functionality and video processor of the STB 105, for example, to output the news flash to the television 120 at the direction of the client application 125 responsible for displaying news items.

Because a variety of different operating systems 122 may be utilized by a variety of different brands and types of set-top boxes, a middleware layer 124 may be provided to allow a given software application to be executed by a variety of different operating systems. According to an embodiment, the middleware layer 124 may include a set of application programming interfaces (APIs) that are exposed to client applications 125 and operating systems 122 that allow the client applications to communicate with the operating systems through common data calls understood via the API set. As described below, a corresponding middleware layer is included on the server side of the CATV system 100 for facilitating communication between the server-side application server and the client-side STB 105. The middleware layer 142 of the server-side application server and the middleware layer 124 of the client-side STB 105 may format data passed between the client side and server side according to the Extensible Markup Language (XML).

The set-top box 105 passes digital and analog video and data signaling to the television 120 via a one-way communication transport 134. The STB 105 may receive video and data from the server side of the CATV system 100 via the HFC network 115 through a video/data downlink and data via a data downlink. The STB 105 may transmit data from the client side of the CATV system 100 to the server side of the CATV system 100 via the HFC network 115 via one data uplink. The video/data downlink is an "in band" downlink that allows for digital and analog video and data signaling from the server side of the CATV system 100 through the HFC network 115 to the set-top box 105 for use by the STB 105 and for distribution to the television set 120. As is understood by those skilled in the art, the "in band" signaling space operates at a relative high frequency, e.g., between 54 and 860 megahertz. The signaling space is generally divided into channels in which may be transmitted as a single analog signal or a greater number (e.g., ten) of digital signals.

The data downlink and the data uplink, illustrated in FIG. 1, between the HFC network 115 and the set-top box 105 comprise "out of band" data links. As is understand by those skilled in the art, the "out of band" frequency range is generally at a lower frequency than "in band" signaling. For example, the "out of band" frequency range may be between zero and 54 megahertz. Data flow between the client-side set-top box 105 and the server-side application server 140 is typically passed through the "out of band" data links. Alternatively, an "in band" data carousel may be positioned in an "in band" channel into which a data feed may be processed from the server-side application server 140 through the HFC network 115 to the client-side STB 105. Operation of data transport between components of the CATV system 100, described with reference to FIG. 1, is well known to those skilled in the art.

Referring still to FIG. 1, the head end 110 of the CATV system 100 is positioned on the server side of the CATV system and includes hardware and software systems responsible for originating and managing content for distributing through the HFC network 115 to client-side STBs 105 for presentation to customers via televisions 120. As described above, a number of services may be provided by the CATV system 100, including digital and analog video programming, interactive television services, telephone services, video-on-demand services, targeted advertising, and provision of information content.

The application server 140 is a general-purpose computing system operative to assemble and manage data sent to and received from the client-side set-top box 105 via the HFC network 115. As described above with reference to the set-top box 105, the application server 140 includes a middleware layer 142 for processing and preparing data from the head end of the CATV system 100 for receipt and use by the client-side set-top box 105. For example, the application server 140 via the middleware layer 142 may obtain data from third-party services 146 via the Internet 144 for transmitting to a customer through the HFC network 115 and the set-top box 105. For example, a weather report from a third-party weather service may be downloaded by the application server via the Internet 144. When the application server 140 receives the downloaded weather report, the middleware layer 142 may be utilized to format the weather report for receipt and use by the set-top box 105.

According to one embodiment, data obtained and managed by the middleware layer 142 of the application server 140 is formatted according to the Extensible Markup Language and is passed to the set-top box 105 through the HFC network 115 where the XML-formatted data may be utilized by a client application 125 in concert with the middleware layer 124, as described above. As should be appreciated by those skilled in the art, a variety of third-party services data, including news data, weather data, sports data and other information content may be obtained by the application server 140 via distributed computing environments such as the Internet 144 for provision to customers via the HFC network 115 and the set-top box 105.

According to embodiments, the application server 140 obtains customer support services data, including billing data, information on customer work order status, answers to frequently asked questions, services provider contact information, and the like from data services 160 for provision to the customer via an interactive television session. As illustrated in FIG. 1, the services provider data services 160 include a number of services operated by the services provider of the CATV system 100 which may include data on a given customer.

A billing system 162 may include information such as a customer's name, street address, business identification number, Social Security number, credit history, and information regarding services and products subscribed to by the customer. According to embodiments, the billing system 162 may also include billing data for services and products subscribed to by the customer for bill processing, billing presentment and payment receipt.

A customer information database 168 may include general information about customers such as place of employment, business address, business telephone number, and demographic information such as age, gender, educational level, and the like. The customer information database 168 may also include information on pending work orders for services or products ordered by the customer. The customer information database 168 may also include general customer information such as answers to frequently asked customer questions and contact information for various service provider offices/departments. As should be understood, this information may be stored in a variety of disparate databases operated by the cable services provider.

Referring still to FIG. 1, web services system 150 is illustrated between the application server 140 and the data services 160. According to embodiments, web services system 150 serves as a collection point for data requested from each of the disparate data services systems comprising the data services 160. According to embodiments, when the application server 140 requires customer services data from one or more of the data services 160, the application server 140 passes a data query to the web services system 150. The web services system formulates a data query to each of the available data services systems for obtaining any required data for a requesting customer as identified by a set-top box identification associated with the customer. The web services system 150 serves as an abstraction layer between the various data services systems and the application server 140. That is, the application server 140 is not required to communicate with the disparate data services systems, nor is the application server 140 required to understand the data structures or data types utilized by the disparate data services systems. The web services system 150 is operative to communicate with each of the disparate data services systems for obtaining necessary customer data. The customer data obtained by the web services system is assembled and is returned to the application server 140 for ultimate processing via the middleware layer 142, as described above.

An authentication system 166 may include information such as secure user names, subscriber profiles, subscriber IDs, and passwords utilized by customers for access to network services. As should be understood by those skilled in the art, the disparate systems 150,162, 166, 168, 175 may be integrated or provided in any combination of separate systems, wherein FIG. 1 shows only one example.

Figure 2:
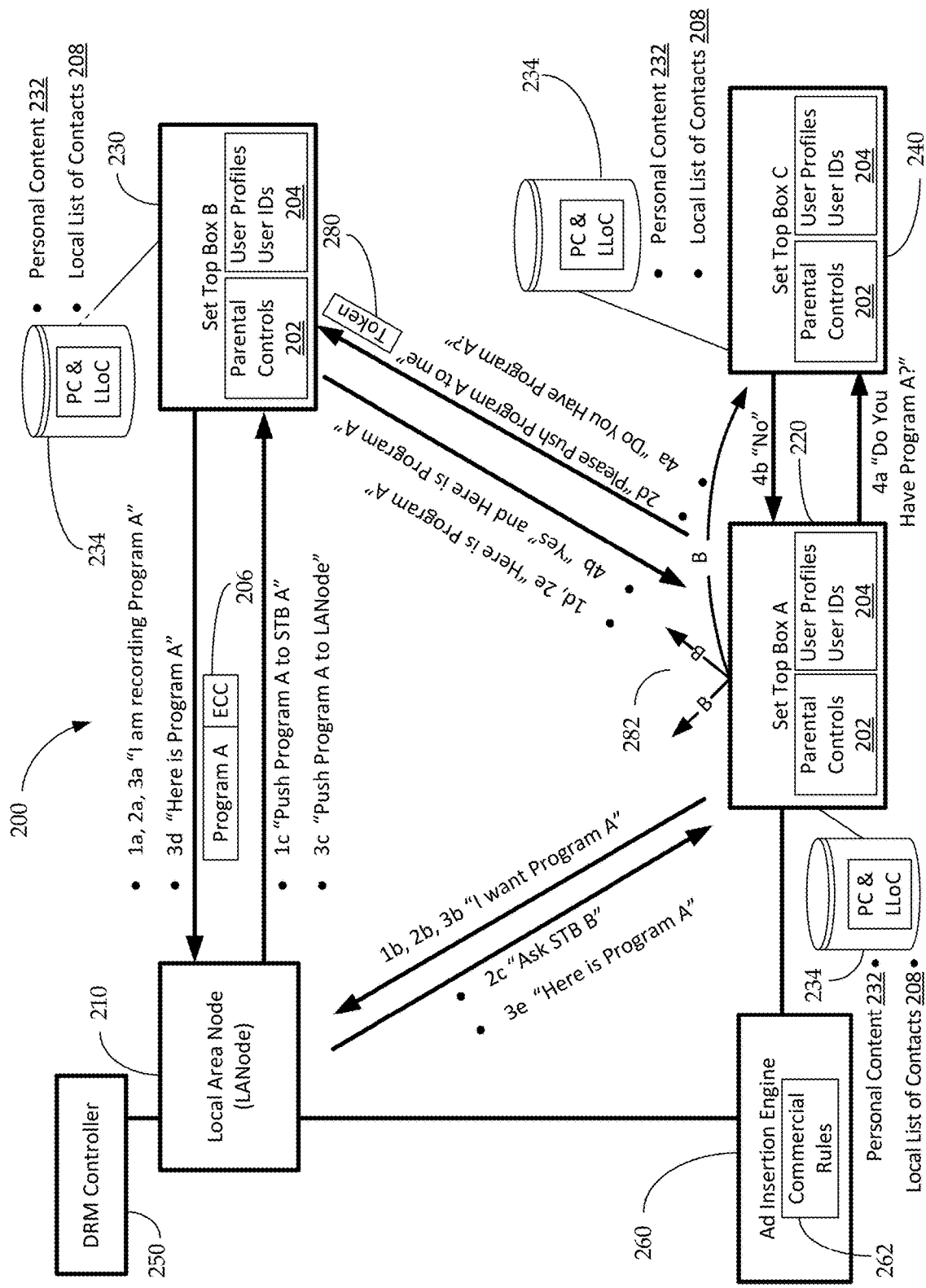
FIG. 2 is a system block diagram of a peer-to-peer (P2P) content sharing network according to an embodiment.

FIG. 2 is a system block diagram 200 of a peer-to-peer (P2P) content sharing network according to an embodiment. FIG. 2 shows a local area node (LANode) 210, set top box (STB) A 220, set top box (STB) B 230, set top box (STB) C 240, a DRM controller 250 coupled to the LANode 210, and an advertisement insertion engine 260. However, those skilled in the art will recognize that the STBs may be any network edge media sharing device, such as a tablet computer, a personal desktop computer, a laptop computer, a mobile phone, or any other device that may be configured for controlling the sharing of content within the network according to the embodiments described herein. Thus, herein where STB is referred to, any other device as described above may be used instead. Nevertheless, for clarity embodiments described herein will primarily refer to such devices as STBs.

Embodiments of a P2P STB network 200 according to at least one embodiment enables a user to request, from friends or other users in the network 200, content that the user missed. For example, a user may decide to watch a program or movie, but discovers that they have missed the first thirty minutes. The user may make a request to a friend or neighbor to stream a desired show to the set top box of the requesting user. The friend/neighbor is currently recording the show and thus can stream a portion of the show to the requesting user so that the requesting user can watch the show from the start.

A first embodiment provides a peer-to-peer (P2P) network that involves using a STB to STB link with push and LANode control. In the first embodiment, STB B 230 informs LANode 210 that STB B 230 is recording Program A. STB A 220 informs LANode 210 that STB A 220 wants Program A. LANode 210 compares the request from STB A 220 to content on other STBs, correlates the Program A identified in the request to Program A recorded by STB B 230 and tells STB B 230 to push Program A to STB A 220. STB B 230 tells STB A 220 that Program A is being provided to STB A 220. The STB B 230 streams the requested Program A to STB A 220 without the need for a handshake.

A second embodiment is a semi-anonymous method that involves a handshake between STBs and LANode. The first STB/LANode act as an intermediary between the third STB and the second STB. In the second embodiment, STB B 230 informs LANode 210 that STB B 230 is recording Program A. STB A 220 informs LANode 210 that STB A wants Program A. LANode 210 tells STB A 220 to ask STB B 230 for Program A. STB A 220 asks STB B 230 to push Program A to STB A 220. STB B 230 provides Program A to STB A 220.

A third embodiment provides anonymity by having STB B 230 inform LANode 210 that STB B 230 is recording Program A. STB A 220 informs LANode 210 that STB A wants Program A. LANode 210 tells STB B 230 to push Program A to the LANode 210. STB B 230 provides Program A to LANode 210. LANode 210 pushes Program A to STB A 220. The LANode 210 may thus check the integrity of the content and inspect the transactions to prevent malicious behavior. Since STB A has no knowledge about STB B, anonymity is maintained. To check the integrity of content, the LANode 210 may compare the content on a headend server (not shown in FIG. 2) and content on the STB A 220, for example.

In a fourth embodiment, STB A 220 asks STB B 230 and STB C 240 if either STB B 230 and STB C 240 have Program A. STB C 240 responds "No" indicating that STB C 240 does not have Program A. STB B 230 responds "Yes" indicating that STB B 230 has Program A. STB B 230 provides Program A to STB A 220. The STBs 230, 240, known by STB A 220 to be in the network, are queried by STB A 220 and could in turn query other STBs, which could keep going recursively until the content is found. Once STB B 230 responds that it has the requested content, the responding STB B 230 begins to stream the requested content to the requesting STB A 220. Alternatively, STB B 230 may provide STB A 220 the STBs that it knows about, e.g., STB C 240 and STB D (not shown), wherein STB A 220 then queries STB C 240 and STB D (not shown) directly. STB C 240 and STB D (not shown) could provide STB A 220 a list of STBs that they know about, which could then continue on until STB A 220 obtains the desired content. Alternatively, STB C 220 could provide LANode 210 the content for provisioning to STB A 220 and provide LANode 210 an identification number that allows LANode 210 deliver the requested content to STB A 220. While the recursive processes described above could go on infinitely, a limit may be used to constrain the process, e.g., the number of iterations may be limited, the area for making inquiries may be limited, the process may be allowed to continue for only a predetermined time, the process may be allowed to continue until a predetermined rule is met, etc.

Other system enhancements may be provided to allow not only STB interfacing, but also to allow interfacing between all video viewing devices. Thus, one of ordinary skill in the art would understand that wherever STB is mentioned, the term video viewing device or client may be substituted because such devices as IP video players, IP-video capable gaming systems, etc. may be configured to share content.

In FIG. 2, where STB A 220 is contacting STB B 230 directly, a token 280 may be used to check whether STB A 220 has the rights to the requested content. STB B 230 may compare the token 280 with data obtained from a DRM controller 250. However, the firmware in STBs 220, 230, 240 may be completely and totally owned and controlled by the network provider. Thus, the DRM issues are not as concerning as when content is transferred in a typical P2P network over the open Internet.

In addition to facilitating the sharing of copyright protected content, personal content 232 from a storage device 234 may be uploaded to STBs 220, 230, 240. In addition, content may be uploaded to other networks, e.g., Facebook®, YouTube®, Vimeo®, etc. In the case of sharing of personal videos from STB A 220, the knowledge of the availability of such personal videos has to be made to STB B 230. A broadcast 282 may be used to inform others of the personal content. Such broadcast may include a URL, an e-mail link, etc. that links back to STB A 220 where the personal content is stored. In addition, social networks could be used to link users in a social STB network. Alternatively, the LANode 210 may be provided a database of all the user uploaded content and a tag for identifying user content. The LANode 210 may announce relevant tagged content to local STBs. Still further, an interface, e.g., for YouTube®, Vimeo®, etc., may be provided for users to access and search all content in a STB network.

STBs 220, 230, 240 have parental controls 202 built into them to control whether a user is able to even see the listings for a particular channel, to control whether a user is allowed to watch the contents of a particular channel, to provide time of day restrictions, etc. Thus, parental control 202 is configured so that a user cannot bypass settings on a STB A 220 by downloading content from another STB 230, 240. Accordingly, STBs 220,230, 240 in the P2P network 200 may be configured to operate in the same manner for controlling normal STB content.

Commercials may be inserted and injected into a stream using advertisement insertion engine 260. For example, content may be stored without commercials. However, commercials may be injected by advertisement insertion engine 260 so that more targeted commercials are provided to a user. Metadata may also be used to identify where a commercial is to be injected or commercials may be injected at various timed intervals. By allowing commercials to be injected, such commercials may be constantly updated without re-updating content. Commercials may be removed from live feeds so that commercial insertion and injection may be implemented at a later time. Commercial rules 262 may be used so that commercial type/time may be determined based on such rules. For example, commercial rules 262 may dictate that at 9 a.m. a predetermined number of minutes of commercials may be inserted, that after 24 hours of live showing have predetermined number of minutes of commercials inserted, that only a set number of commercials are inserted if a subscriber has watched a predetermined number of shows, etc. Meta-tags may also be provided with content by users so that content is shared only with people that the user authorizes. Further, profiles or different user IDs 204 associated with different STBs 220, 230, 240 may be used to target different commercials towards different profiled users. The advertisement insertion engine 260 may use the profiles and/or different user IDs 204 to personalize content for specific users.

Likewise, rather that streaming video on demand (VOD) content from a VOD server in a centralized data center, STB B 230 and STB C 240 may be queried for the VOD by a requesting STB A 220 and the content streamed from STB B 230 having the content to the requesting STB A 220 so that overall bandwidth in the network, especially from the headend or centralized servers, may be minimized. STBs 220, 230, 240 may also cache commonly visited websites, VOD programming, TV shows, etc. Thus any type of content may be stored between STBs 220, 230, 240.

Sharing of content is facilitated using rights management through DRM controller 250. Accordingly, authentication/authorization may be verified through a rights management by DRM controller 250. The rights to download and the rights to upload should be verified for each transaction where rights management is an issue. For example, a subscriber to a premium channel is verified before allowing that user to download content associated with the premium channel. In the case of a partial recording, the mere fact that that a user was able to record the content implies that the user had the right to access the recorded content. Accordingly, the rights management provided by the DRM controller 250 does not have to be as robust as when entire programs are being transferred. Verification of customer rights may be based on a lookup of a customer number or customer ID using DRM controller 250.

In addition, since there are most likely a large number STBs recording the same program, error correction coding 206 may be implemented to verify that a file being uploaded to a requesting STB A 220 is the correct file (security), and that it is error free, e.g., eliminate video feeds that are of unsatisfactory quality, etc.

System 200 may also be configured to operate even if the LANode (tracker) 210 is down. Each STB 220, 230, 240 may keep a local list of contacts 208 that it knows about. Then, if the LANode 210 is down, each STB 220, 230, 240 will look at their local list of contacts 208 and ask all of its contacts what STBs they know about. This process may continue recursively. For example, STB A 220 may know about STB B 230 and STB C 240. Thus STB A 220 may ask STB B 230 and STB C 240 what other STBs they know about. STB B 230 and STB C 240 may respond by identifying STB D, STB E and STB F (not shown). Then, STB A 220 may ask STB D, STB E and STB F what other STBs they know about, etc.

Figure 3:
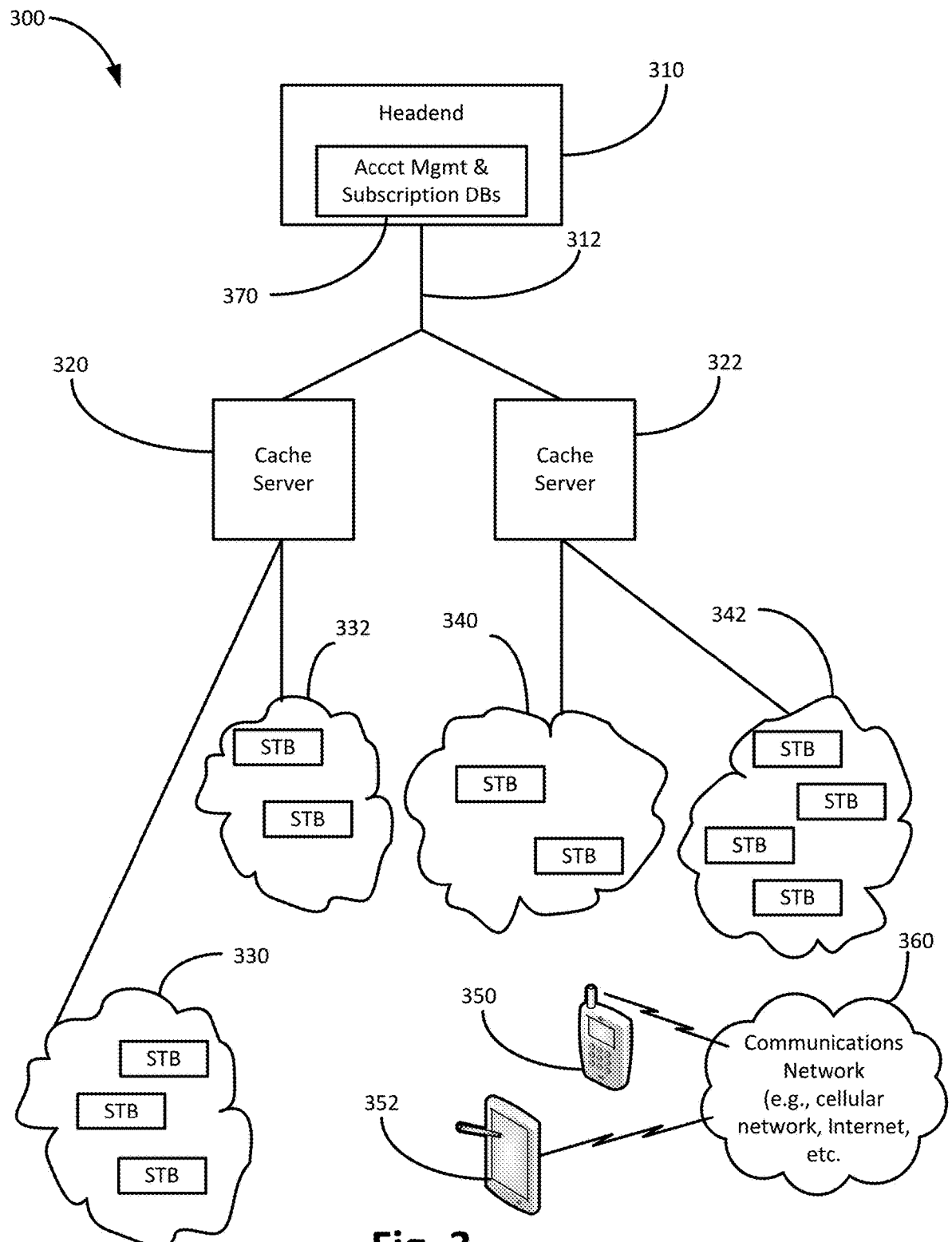
FIG. 3 illustrates a content distribution network according to an embodiment.

FIG. 3 illustrates a content distribution network 300 according to an embodiment. By streaming a portion of a program from a friend or neighbor, strain will be released from the headend 310 and backbone 312 used to distribute content such as programs and movies. In addition, the content distribution service provider is able to reduce the number of cache servers 320, 322 used to provide content streams. By streaming content from a more local user, i.e., STBs in local networks 330, 332, 340, 342, latency will be reduced due to the decreased distance that the content has to travel. Further, streaming content from a more local user allows the content distribution service provider to add new features and offerings that were not previously possible.

In addition to STBs, embodiments may be extended to cell phones 350, tablet computers 352 and any other type of device that can be used to access a communications network 360 and transfer media to a user.

Moreover, STBs within a network may be used to help compliment viewers' DVRs and to provide bigger media library. Video on demand (VOD) content may be cached remotely at a headend 310 or cache servers 320, 322, or distributed between multiple STBs in local networks 330, 332, 340, 342. Content that is recorded, e.g., on a DVR, may be shared potentially with other people who are also part of the same network or in the same local area to cut down on upstream bandwidth, e.g., from the headend. In terms of providing rights management, account management and subscription databases 370 at a centralized headend 310 may also be used to provide such verification.

Figure 4:
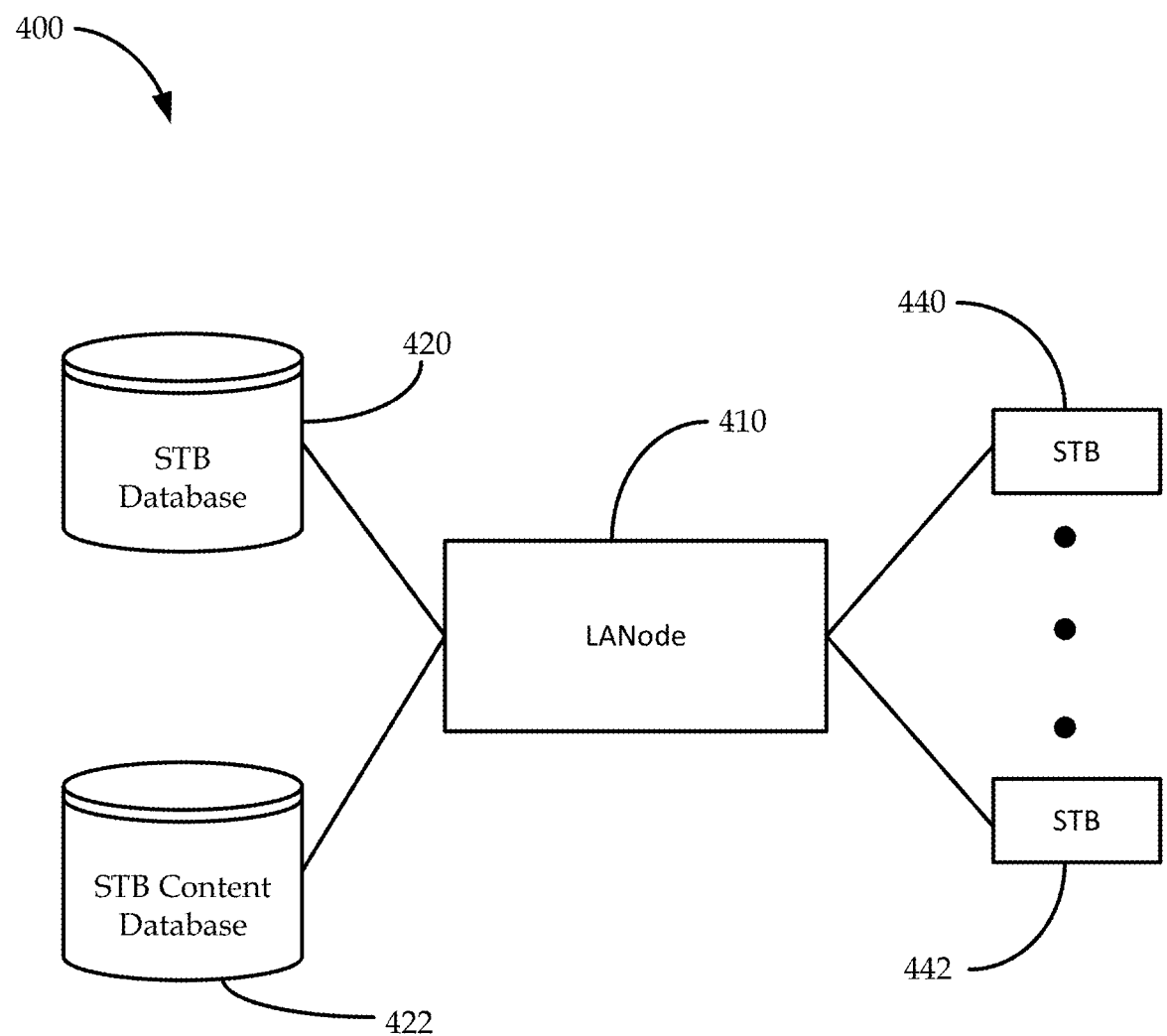
FIG. 4 illustrates a system providing a P2P network according to an embodiment.

FIG. 4 illustrates a system 400 providing a P2P network according to an embodiment. In FIG. 4, a LANode 410 maintains within the system 400 a database of STBs 420 and a database of content stored on the STBs 422. The STBs 440, 442, coupled to LANode 410, may communicate with the LANode 410 and query the LANode 410 to identify content recorded on the other STBs 440, 442 within the network. This information may be maintained in databases 420, 422 that the LANode 410 could access and determine where such content is located. Each STB 440, 442 may thus act as client/server.

Figure 5:
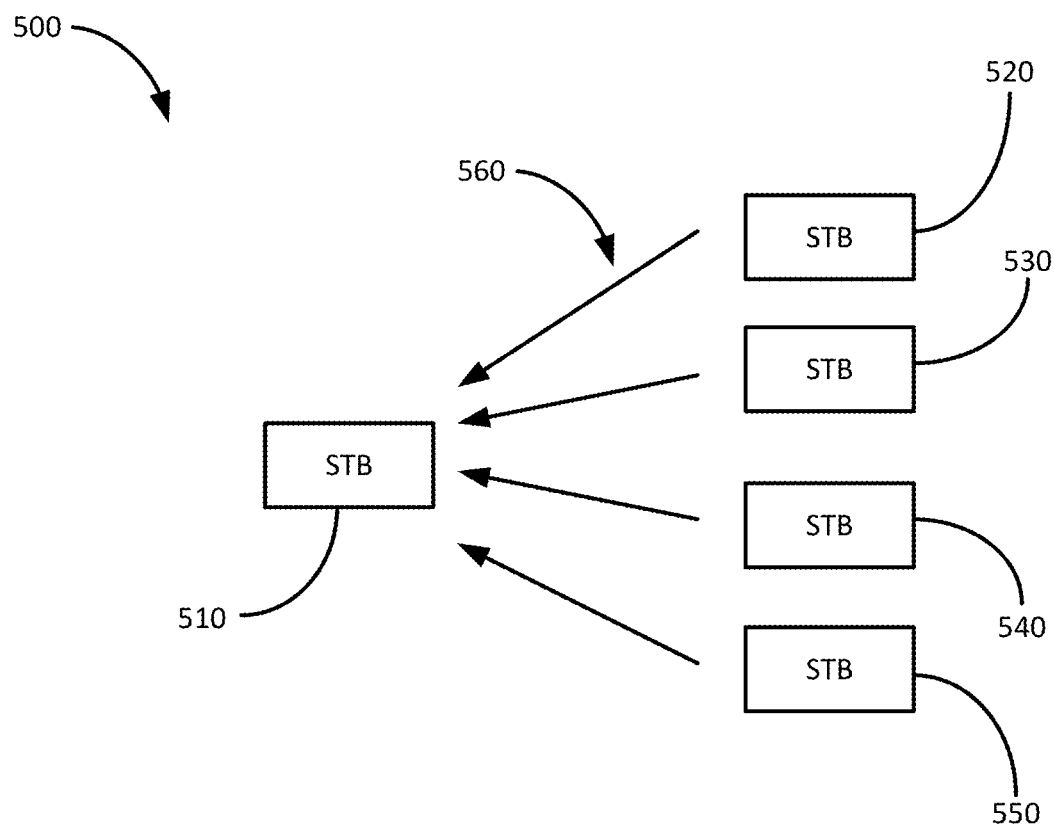
FIG. 5 shows the multicasting of content according to an embodiment.

FIG. 5 shows the multicasting of content 500 according to an embodiment. The network may be configured to allow multiple STBs 520, 530, 540, 550 stream a program 560 to a video viewing device or STB 510. For example, if a first STB 510 wants to watch Program A and STBs 520, 530, 540, 550 have Program A, the network may be configured to enable STBs 520, 530, 540, 550 to stream Program A to the first STB 510 by each of STBs 520, 530, 540, 550 streaming only a portion 560 of Program A. Moreover, the configuration for allowing such multicasting may be set to depend on network loading and how busy each of the other STBs are with their own local tasks.

Figure 6:
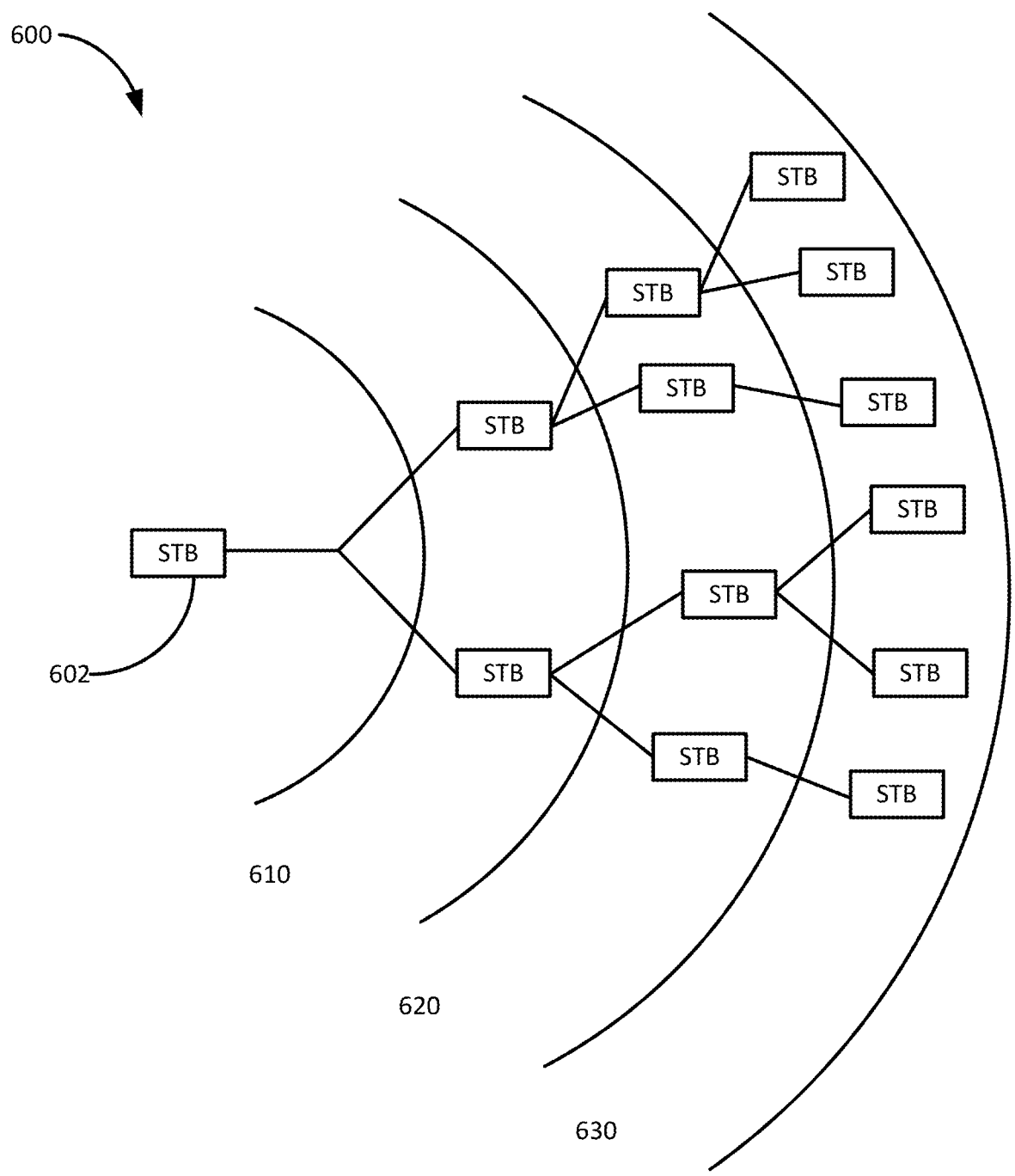
FIG. 6 shows a concentric ring search through a P2P STB network according to an embodiment.

FIG. 6 shows a concentric ring search through a P2P STB network 600 according to an embodiment. Concentric ring transfer involves looking in a ring of a first confined area 610 first and expanding the search to a second confined area 620 when content is not found in the first confined area 610, and then expanding the search to a third confined area 630 when content is not found in the second confined area 620, and so on. For example, a search for a file may first be conducted in a neighborhood, and then the search may expand to look in a local area associated with the STB, and then expanding outwardly to the county, city, state, country, etc. A LANode (not shown) may be used to instruct a source STB that is closest to the target/requesting STB 602 to stream requested content to the target/requesting STB 602. However, a LANode is not required. The target/requesting STB 602 may simply search in an expanding manner until the desired content is located.

Figure 7:
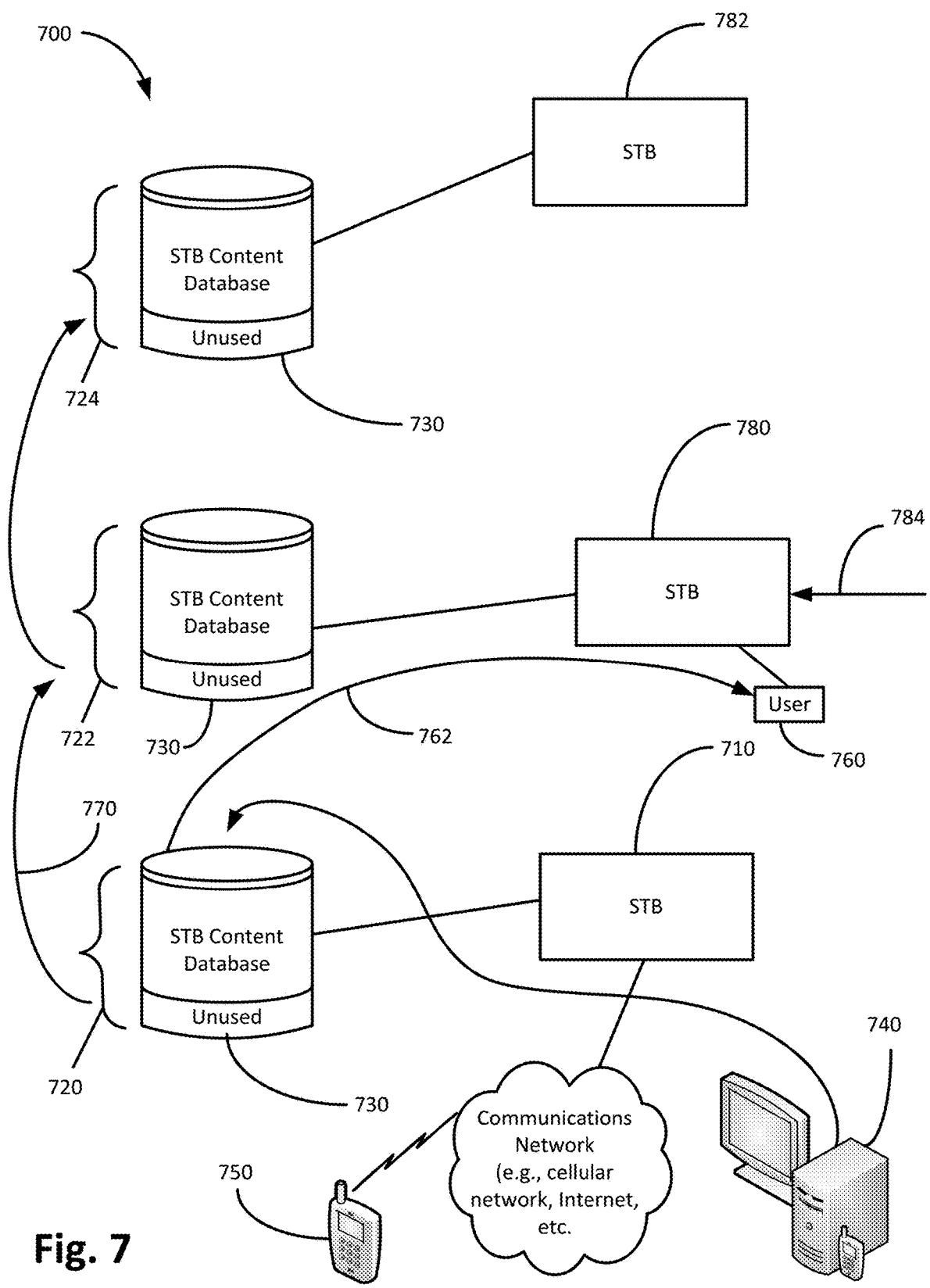
FIG. 7 shows the STBs acting as a home cloud backup service according to an embodiment.

FIG. 7 shows the STBs acting as a home cloud backup service 700 according to an embodiment. In FIG. 7, each STB 710, 780, 782 has a certain amount of storage 720, 722, 724, respectively, wherein at least a portion may be unused storage 730. Thus, home computers 740 could back up data to the STB 710. Such data may be remotely accessed from the STB 710 by mobile devices 750. A link could be provided to another user 760 to allow the other user 760 to download content 762 from the first user's cloud storage 720. In addition, data may be mirrored and/or redundantly stored 770 through all the STBs 710, 780, 782, in the network so that users could recover data in the case of a hard drive failure. Each STB 710, 780, 782 in the network may only store a small portion of a data file. The storage would also provide a customer service that allows a user to recover valued content from other STBs 780, 782 when the user's STB 710 fails.

Furthermore, a STB 710 may use unused storage 730 of storage 722 of another STB 780 that is not currently being used when the storage capacity of the STB 710 has been exhausted. Thus, a user of a first STB 710 may use the storage capacity of a second user's STB 780 to provide a temporary backup mode when the first user reaches the limit of their storage capacity on the first STB 710. Also, the STB 780, 782 of other users may be used to provide the capability of recording many different content streams 784. For example, when STB 780 is not in use, STB 710 may request STB 780 to record content, which may be 1 or more streams 784 depending on the ability of STB 780. Once content is downloaded to STB 780, the content may be provided to the STB 710 of a requesting user.

Figure 8:
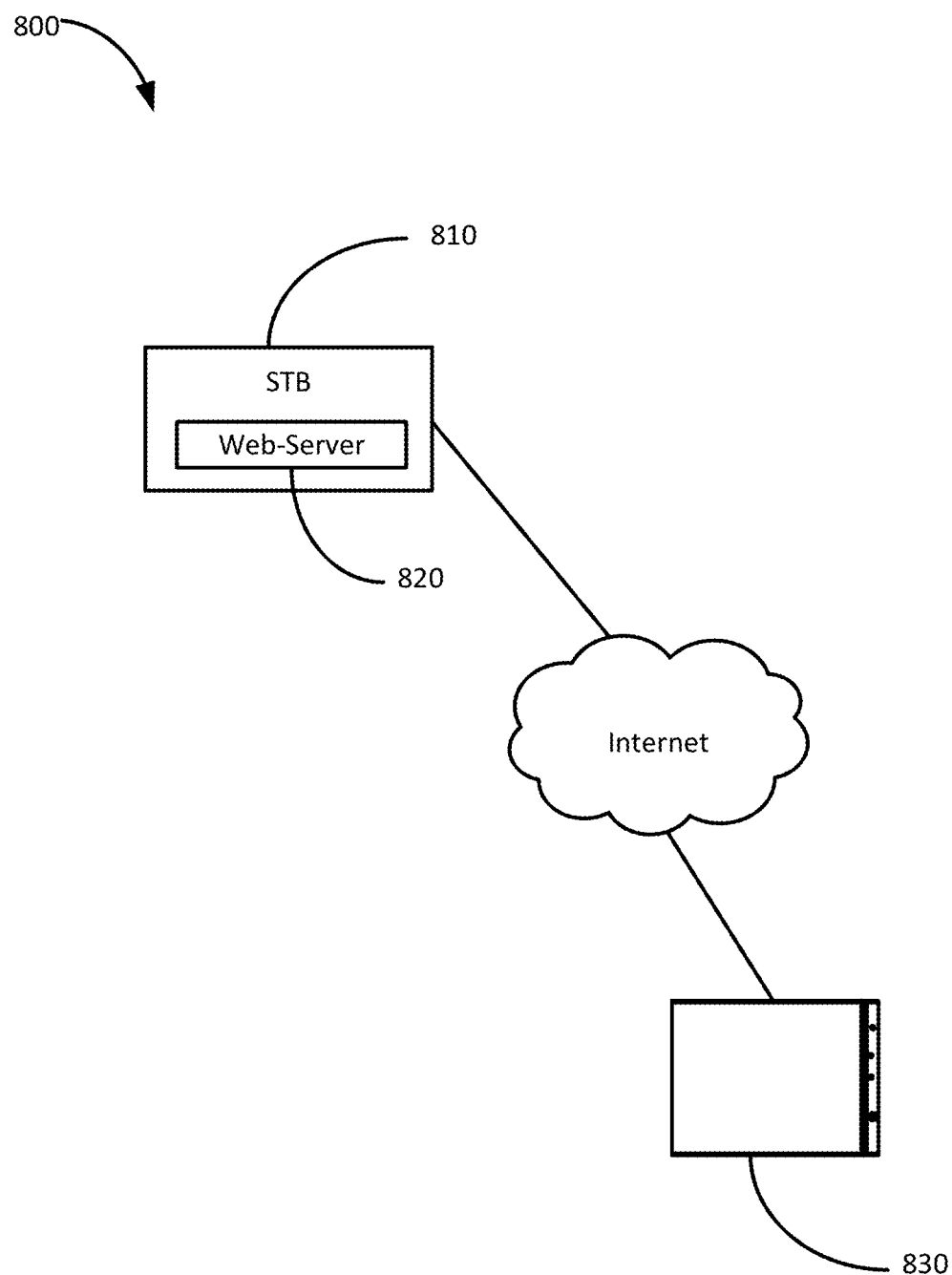
FIG. 8 illustrates operation of a STB web-server in the P2P STB network according to an embodiment.

FIG. 8 illustrates operation of a STB web-server 800 in the P2P STB network according to an embodiment. A STB 810 may be configured to implement a home web-server 820 that allows any video viewing device 830 to connect to that person's STB website. For example, if a first user having video viewing device 830 wanted to watch content from a second user's STB 810, remotely, the first user having video viewing device 830 may access the STB web server 820 of the second user to initiate downloading and/or streaming of content from the second user's STB 810. Thus, any content on a STB 810 may be shared to users not in the STB P2P network through the home web server 820.

In addition, those of ordinary skill in the art will recognize that embodiments may be configured to provide any permutations between the two extremes of all the video content located at the edge versus all video content located centrally.

Figure 9:
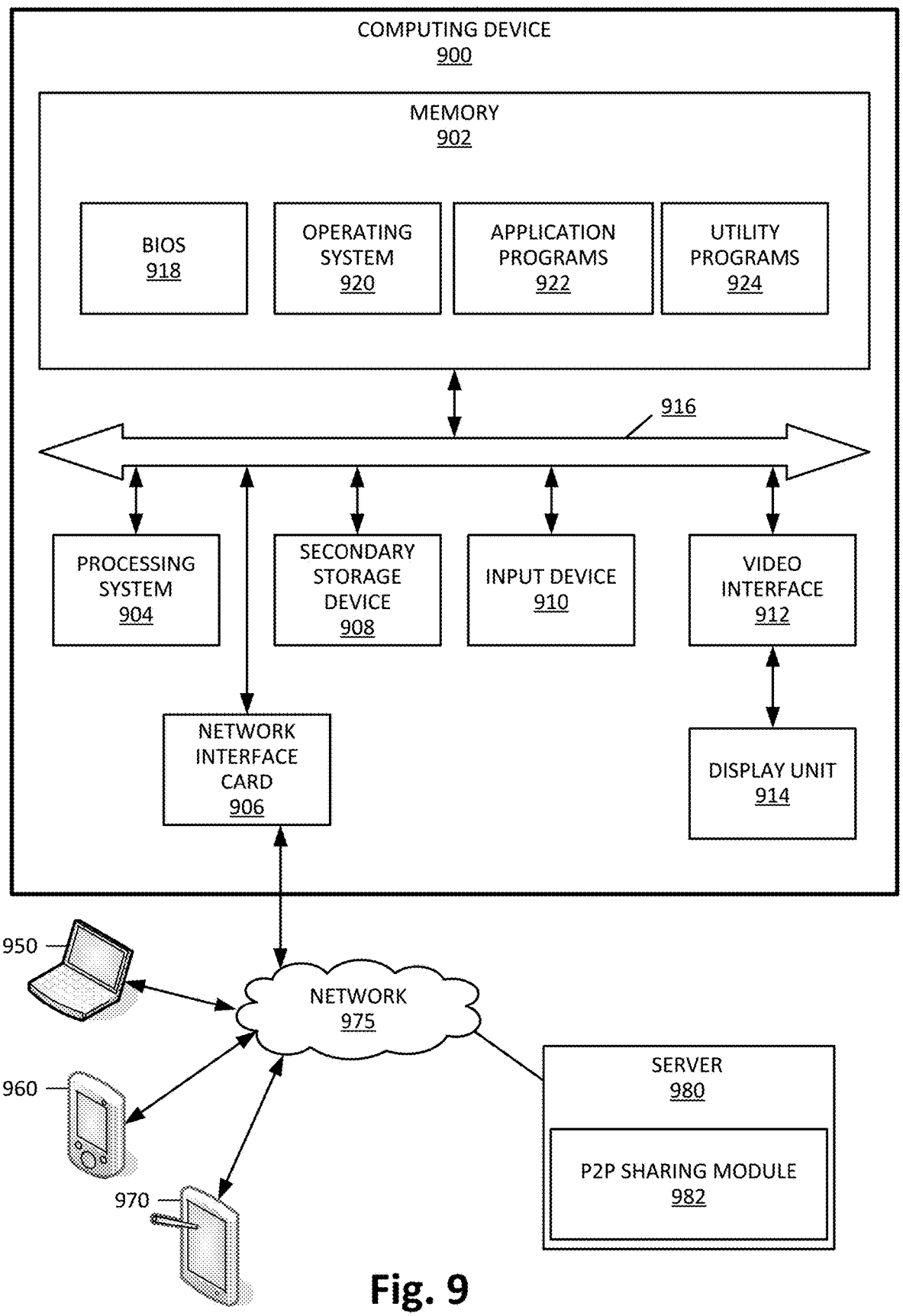
FIG. 9 is a block diagram illustrating example physical components of a computing device with which embodiments may be practiced and a system architecture for enabling operation of a localized peer-to-peer (P2P) network of media devices for streaming content between users.

FIG. 9 is a block diagram illustrating example physical components of a computing device 900 with which embodiments may be practiced. In some embodiments, the peer-to-peer sharing module 982 may be implemented using one or more computing devices like the computing device 900. It should be appreciated that in other embodiments, the peer-to-peer sharing module 982 may be implemented using computing devices having hardware components other than those illustrated in the example of FIG. 9.

Computing devices may be implemented in different ways in different embodiments. For instance, in the example of FIG. 9, the computing device includes a processing system 904, memory 902, a network interface 906, a secondary storage device 908, an input device 910, a video interface 912, a display unit 914, and a communication medium 916. In other embodiments, the computing device 900 may be implemented using more or fewer hardware components (e.g., a video interface, a display unit, or an input device) or in combination with other types of computer systems and program modules.

The memory 902 includes one or more computer-readable storage media capable of storing data and/or computer-executable instructions. According to one embodiment, the peer-to-peer sharing module 982 may be stored locally on computing device 900. Memory 902 thus may store the computer-executable instructions that, when executed by processor 904, cause the peer-to-peer sharing module to record content at a first edge device in a network, send a query within the network from a second edge device to identify desired content, compare the desired content identified in the query to content recorded at the first edge device and receive from the first edge device the desired content identified in the query from the second edge device as described above with reference to FIGS. 1-8.

In various embodiments, the memory 902 is implemented in various ways. For example, the memory 902 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

According to embodiments, the term computer-readable media includes communication media and computer-readable storage media. Communication media include information delivery media. Computer-executable instructions, data structures, program modules, or other data in a modulated data signal, such as a carrier wave or other transport mechanism, may be embodied on a communications medium. The term modulated data signal describes a signal that has one or more characteristics set or changed in such a manner as to encode information in the signal. For example, communication media can include wired media, such as a wired network or direct-wired connection, and wireless media, such as acoustic, radio frequency (RF), infrared, and other wireless media.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 904 includes one or more processing units, which may include tangible integrated circuits that selectively execute computer-executable instructions. In various embodiments, the processing units in the processing system 904 are implemented in various ways. For example, the processing units in the processing system 904 can be implemented as one or more processing cores. In this example, the processing system 904 can comprise one or more Intel Core microprocessors. In another example, the processing system 904 can comprise one or more separate microprocessors. In yet another example embodiment, the processing system 904 can comprise Application-Specific Integrated Circuits (ASICs) that provide specific functionality. In yet another example, the processing system 904 provides specific functionality by using an ASIC and by executing computer-executable instructions.

The computing device 900 may be enabled to send data to and receive data from a communication network via a network interface card 906. In different embodiments, the network interface card 906 is implemented in different ways, such as an Ethernet interface, a token-ring network interface, a fiber optic network interface, a wireless network interface (e.g., Wi-Fi, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 908 includes one or more computer-readable storage media, and may store data and computer-executable instructions not directly accessible by the processing system 904. That is, the processing system 904 performs an I/O operation to retrieve data and/or computer-executable instructions from the secondary storage device 908. In various embodiments, the secondary storage device 908 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 910 enables the computing device 900 to receive input from a user. Example types of input devices include, but are not limited to, keyboards, mice, trackballs, stylus input devices, key pads, microphones, joysticks, touch-sensitive display screens, and other types of devices that provide user input to the computing device 900.

The video interface 912 outputs video information to the display unit 914. In different embodiments, the video interface 912 is implemented in different ways. For example, the video interface 912 is a video expansion card. In another example, the video interface 912 is integrated into a motherboard of the computing device 900. In various embodiments, the display unit 914 can be a an LCD display panel, a touch-sensitive display panel, an LED screen, a projector, a cathode-ray tube display, or another type of display unit. In various embodiments, the video interface 912 communicates with the display unit 914 in various ways. For example, the video interface 912 can communicate with the display unit 914 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 916 facilitates communication among the hardware components of the computing device 900. In different embodiments, the communications medium 916 facilitates communication among different components of the computing device 900. For instance, in the example of FIG. 9, the communications medium 916 facilitates communication among the memory 902, the processing system 904, the network interface card 906, the secondary storage device 908, the input device 910, and the video interface 912. In different embodiments, the communications medium 916 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 902 stores various types of data and/or software instructions. For instance, in the example of FIG. 9, the memory 902 stores a Basic Input/Output System (BIOS) 918, and an operating system 920. The BIOS 918 includes a set of software instructions that, when executed by the processing system 904, cause the computing device 900 to boot up. The operating system 920 includes a set of software instructions that, when executed by the processing system 904, cause the computing device 900 to provide an operating system that coordinates the activities and sharing of resources of the computing device 900. The memory 902 also stores one or more application programs 922 that, when executed by the processing system 904, cause the computing device 900 to provide applications to users, for example, peer-to-peer sharing module 982. The memory 902 also stores one or more utility programs 924 that, when executed by the processing system 904, cause the computing device 900 to provide utilities to other software programs.

Embodiments of the present invention may be utilized in various distributed computing environments where tasks are performed by remote processing devices that are linked through a communications network in a distributed computing environment.

Moreover, embodiments may be implemented such that each or many of the components illustrated in FIG. 9 may be integrated onto a single integrated circuit. When operating via such a single integrated circuit, the functionality, described herein, with respect to peer-to-peer sharing module 982 may be operated via application-specific logic integrated with other components of the computing device/system 900 on the single integrated circuit.

A server 980 may provide the peer-to-peer sharing module 982 to client devices. As one example, server 980 may be a web server providing the peer-to-peer sharing module 982 over the web. Server 980 may provide the peer-to-peer sharing module 982 over the web to clients through a network 975. Examples of clients that may obtain the peer-to-peer sharing module 982 include computing device 950, which may include any general purpose personal computer (such as computing device 900), a tablet computing device 970 and/or mobile computing device 960, such as smart phones.

FIGS. 10a-b illustrate a suitable mobile computing environment, for example, a mobile computing device 1000, a smart phone, a tablet personal computer, a laptop computer, and the like, with which embodiments may be practiced. The mobile computing device 1000 is illustrative of any suitable device operative to send, receive and process wireless communications according to embodiments of the present invention. A display screen 1005 is operative for displaying a variety of information such as information about incoming and outgoing communications, as well as, a variety of data and displayable objects, for example, text, alphanumeric data, photographs, and the like.

Data input to the device 1000 may be performed via a variety of suitable means, such as, touch screen input via the display screen 1005, keyboard or keypad input via a data entry area 1010, key input via one or more selectable buttons or controls 1015, voice input via a microphone 1018 disposed on the device 1000, photographic input via a camera 1025 functionality associated with the mobile computing device, or any other suitable input means. Data may be output via the device 1000 via any suitable output means, including but not limited to, display on the display screen 1005, audible output via an associated speaker 1030 or connected earphone system, vibration module for providing tactile output, and the like.

Operational unit 1035 is illustrative of internal operating functionality of the mobile computing device 1000. A processor 1040 is illustrative of a general purpose computer processor for processing incoming and outgoing data and communications and controlling operation of the device and associated software applications via a mobile computing device operating system. Memory 1045 may be utilized for storing a device operating system, device programming, one or more stored applications, for example, mobile telephone applications, data processing applications, calculators, games, Internet browsing applications, navigation applications, acceleration applications, camera and/or video applications, etc. According to one embodiment, the peer-to-peer sharing module 1020 may be stored locally on mobile computing device 1000.

Mobile computing device 1000 may contain an accelerometer 1055 for detecting acceleration, and can be used to sense orientation, vibration, and/or shock. Mobile computing device 1000 may contain a global positioning system (GPS) system (e.g., GPS send/receive functionality) 1060. A GPS system 1060 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 1050 include all required functionality, including onboard antennae, for allowing the device 1000 to communicate with other communication devices and systems via a wireless network. Radio functions 1050 may be utilized to communicate with a wireless or WIFI-based positioning system to determine a device's 1000 location.

Although described herein in combination with mobile computing device 1000, in alternative embodiments the invention may be used in combination with any number of computer systems, such as in desktop environments, laptop or notebook computer systems, multiprocessor systems, micro-processor based or programmable consumer electronics, networked PCs, mini computers, main frame computers and the like. Embodiments of the present invention may be utilized in various distributed computing environments where tasks are performed by remote processing devices that are linked through a communications network in a distributed computing environment, and where programs may be located in both local and remote memory storage.

Embodiments, for example, are described above with reference to block diagrams and/or operational illustrations of methods, systems, and computer program products according to embodiments. The functions/acts noted in the blocks may occur out of the order as shown in any flowchart or described herein with reference to FIGS. 1-8. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method of utilizing a peer-to-peer network for sharing content within a network, comprising:
   recording content at a start of a program at a first edge device in a local network, the first edge device being a first set top box;
   determining via a user at a second edge device within the local network that the start of the program has passed, the second edge device being a second set top box;
   receiving at the first edge device a query from the second edge device within the local network, the query identifying desired content including content originally streamed from a hybrid fiber coaxial network;
   comparing the desired content identified in the query to the content recorded at the start of the program at the first edge device, the comparing being performed at a local area node that identifies the first edge device as having the desired content by performing a concentric ring search that includes searching for the desired content in set top boxes located in a first confined area, expanding the search to a second confined area when the desired content is not found in the first confined area, the second confined area being larger than the first confined area, and searching in an expanding manner until the desired content is located, the local area node and first and second edge devices being located together in the local network;
   sending from the first edge device at least a portion of the desired content identified in the query from the second edge device when content recorded from the start of the program at the first edge device correlates to the desired content identified in the query from the second edge device, and a remainder of the desired content being provided from another edge device in the local network depending on a network loading of the first edge device with local tasks; and
   providing a temporary backup mode when the second edge device reaches a storage capacity limit by having the second edge device use an unused storage of the first edge device.

2. The method of claim 1, wherein the desired content is provided to the second edge device using a common protocol with appropriate encryption.

3. The method of claim 1, further comprising instructing, by the local area node, for the first edge device to stream the desired content directly to the second edge device.

4. The method of claim 1, further comprising instructing, by the local area node, the first edge device to stream the desired content directly to the local area node, the local area node receiving the desired content from the first edge device and streaming the received desired content to the second edge device.

5. The method of claim 1, further comprising instructing, by the local area node, the second edge device to request the desired content from the first edge device, and upon the first edge device receiving the request from the second edge device, streaming the desired content directly to the second edge device from the first edge device.

6. The method of claim 1 further comprising providing to at least the first and second edge devices at least one content authorization control selected from the group consisting of parental controls and user profiles.

7. The method of claim 1, wherein the recording content at a first edge device in the local network further comprises recording content without commercials, and wherein the sending from the first edge device the desired content identified in the query from the second edge device further comprises inserting commercials into the desired content and streaming the desired content with the inserted commercials to the second edge device.

8. The method of claim 1, wherein the comparing the desired content identified in the query to content recorded at the first edge device further comprises accessing a digital rights management system to verify the rights of the first edge device and the second edge device to the desired content.

9. The method of claim 1 further comprising providing storage at the first edge device, the storage at the first edge device being used by the second edge device to access and store content thereat.

10. The method of claim 1, wherein recording the program includes attaching meta-tags by the first edge device to authorize the second edge device to download the program.

11. The method of claim 1, further comprising sending from the first edge device a list of other edge devices known to the second edge device.

12. The method of claim 1, further comprising sending from the first edge device the desired content identified in the query and an identification number to the local area node, the identification number allowing the local area node to deliver the desired content identified in the query to the second edge device.

13. The method of claim 1, further comprising using a token to determine whether the second edge device has rights to the desired content identified in the query.

14. A system for providing peer-to-peer network sharing of content, comprising:
 a first edge device in a local network, the first edge device being a first set top box configured to record a start of a program;
 a second edge device in the local network, the second edge device being a second set top box configured to determine that the start of the program has passed and to send a query within the local network identifying content desired by the second edge device, the content including content originally streamed from a hybrid fiber coaxial network, and when the second edge device reaches a storage capacity limit, a temporary backup mode is provided by having the second edge device use an unused storage of the first edge device; and
 a local area node located together with the first and second edge devices in the local network, and operable to compare the identified content desired by the second edge device to a recorded portion at the start of the program recorded at the first edge device, determine the desired content is located at the first edge device, and provide the recorded portion of the program for delivery to the second edge device, wherein the local area node identifies the first edge device as having the desired content by performing a concentric ring search that includes searching for the desired content in set top boxes located in a first confined area, expanding the search to a second confined area when the desired content is not found in the first confined area, the second confined area being larger than the first confined area, and searching in an expanding manner until the desired content is located, wherein the first edge device sends at least a portion of the desired content identified in the query from the second edge device when content recorded from the start of the program at the first edge device correlates to the desired content identified in the query from the second edge device, and a remainder of the desired content being provided from another edge device in the local network depending on a network loading of the first edge device with local tasks.

15. The system of claim 14, wherein the local area node instructs the second edge device to request the desired content from the first edge device, and upon receiving by the first edge device the request from the second edge device, streams the desired content directly to the second edge device.

16. The system of claim 14, wherein the query sent by the second edge device is received by a plurality of edge devices in the local network including the first edge device, the first edge device sending the second edge device a confirmation that the first edge device has the desired content, the first edge device streaming the desired content to the second edge device.

17. The system of claim 14 further comprising an advertisement insertion engine for inserting commercials into content transferred within the local network between the first edge device and the second edge device and a digital right management controller for controlling the transfer of content within the local network according to rights of the first edge device and the second edge device associated with the desired content.

18. The system of claim 14 further comprising storage provided at the first edge device, the storage at the first edge device being used by the second edge device to access and store content thereat.

19. A computer readable storage device including executable instructions which, when executed by a processor, provides peer-to-peer network sharing of content, by:
 recording content at a start of a program at a first edge device in a local network, the first edge device being a first set top box;
 determining via a user at a second edge device within the local network that the start of the program has passed, the second edge device being a second set top box;
 receiving a query at the first edge device from the second edge device within the local network identifying desired content including content originally streamed from a hybrid fiber coaxial network;
 comparing the desired content identified in the query to the content recorded at the start of the program at the first edge device, the comparing being performed at a local area node that identifies the first edge device as having the desired content by performing a concentric ring search that includes searching for the desired content in set top boxes located in a first confined area, expanding the search to a second confined area when the desired content is not found in the first confined area, the second confined area being larger than the first confined area, and searching in an expanding manner until the desired content is located, the local area node and first and second edge devices being located together in the local network;

sending from the first edge device at least a portion of the desired content identified in the query from the second edge device when content recorded from the start of the program at the first edge device correlates to the desired content identified in the query from the second edge device, and a remainder of the desired content being provided from another edge device in the local network depending on a network loading of the first edge device with local tasks; and providing a temporary backup mode when the second edge device reaches a storage capacity limit by having the second edge device use an unused storage of the first edge device.

\* \* \* \* \*